United States Patent [19]

Müller et al.

[11] 3,939,749

[45] Feb. 24, 1976

[54] BAND SAW

[75] Inventors: Ernst Müller, Balingen; Alois Butz, Geislingen, both of Germany

[73] Assignee: Bizerba-Werke, Wilhelm Kraut KG, Germany

[22] Filed: May 5, 1975

[21] Appl. No.: 574,400

[30] Foreign Application Priority Data

May 27, 1974 Germany............................ 2425531

[52] U.S. Cl. ....................... 83/814; 83/397; 83/544; 83/478; 83/860

[51] Int. Cl.$^2$ B27G 19/06; B27G 3/00; B23D 55/02

[58] Field of Search ............. 83/814, 544, 860, 478, 83/397

[56] References Cited

UNITED STATES PATENTS

| | | | |
|---|---|---|---|
| 3,580,307 | 5/1971 | Minetos | 83/544 X |
| 3,848,502 | 11/1974 | O'Neill | 83/814 |
| 3,888,148 | 6/1975 | Weissman | 83/478 X |

FOREIGN PATENTS OR APPLICATIONS

| | | | |
|---|---|---|---|
| 741,079 | 11/1955 | United Kingdom | 83/814 |

*Primary Examiner*—Willie G. Abercrombie
*Attorney, Agent, or Firm*—Olsen and Stephenson

[57] ABSTRACT

A band saw which has a displaceable guard rail that covers the saw blade in the cutting region thereof above the feed table and is adapted to be displaced upward in a direction parallel to the saw blade and away from the feed table to the height necessary to allow passage of the stock that is being cut. The band saw includes apparatus for raising the guard rail the necessary height in response to exerting pressure by the stock against the guard rail in the direction of cutting, and the apparatus will then maintain the guard rail at a height conforming to the contour of the stock as the latter is passed through the saw blade. Other apparatus provides smooth movement of the guard rail during cutting operations and provides for securing of the guard rail when the band saw is not in operation.

12 Claims, 2 Drawing Figures

BAND SAW

BACKGROUND OF THE INVENTION

The present invention concerns a band saw, especially adapted for cutting bone and meat and is of the type which has a saw blade running over an upper and a lower saw wheel, a feed table for the cutting stock, and a guard rail that covers the saw blade.

Insofar as the cutting process permits, bone and meat saws must be equipped so that the operating personnel expose their hands an absolute minimum to the danger region of the saw blade.

Band saws are known which have a guard rail that covers the saw blade and is mounted in the upper wheel housing of the machine and which can be displaced parallel to the saw blade to a designated height. These guard rails have the disadvantage that they must be arrested at the height of the cutting stock and hinder the continuous feed. A reliable accident prevention is thereby not provided, because the guard rail will remain arrested at the selected height necessary for the passage of the stock or at the maximum possible passage height even when no cutting stock is being sawed. Also, the guard rail may remain elevated at the maximum height when cutting stock having a relatively small height is to be sawed.

Therefore, it is the object of the present invention to provide a protective cover or guard rail for the envisaged working region of the saw blade, the height setting of which automatically adapts itself to the cutting stock and to the differences in height of an individual item of cutting stock and after completion of the sawing process automatically assumes an initial position covering the entire sawing region.

SUMMARY OF THE INVENTION

The inadequacies of the prior art are overcome by the present invention wherein the guard rail is mounted so that it can be displaced parallel to the saw blade and can be swivelled or pivoted in a plane parallel to the cutting direction about an axis arranged above the cutting region, and a rotating friction wheel is arranged in the upper part of the band saw in such a manner that it is engaged on swivelling or pivoting of the guard rail in the cutting direction into a force-locking connection with the guard rail or an associated part that is firmly connected with the guard rail so that the guard rail is moved upwardly and exposes the saw blade only to the height of passage necessary for the cutting stock that is to be sawed.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
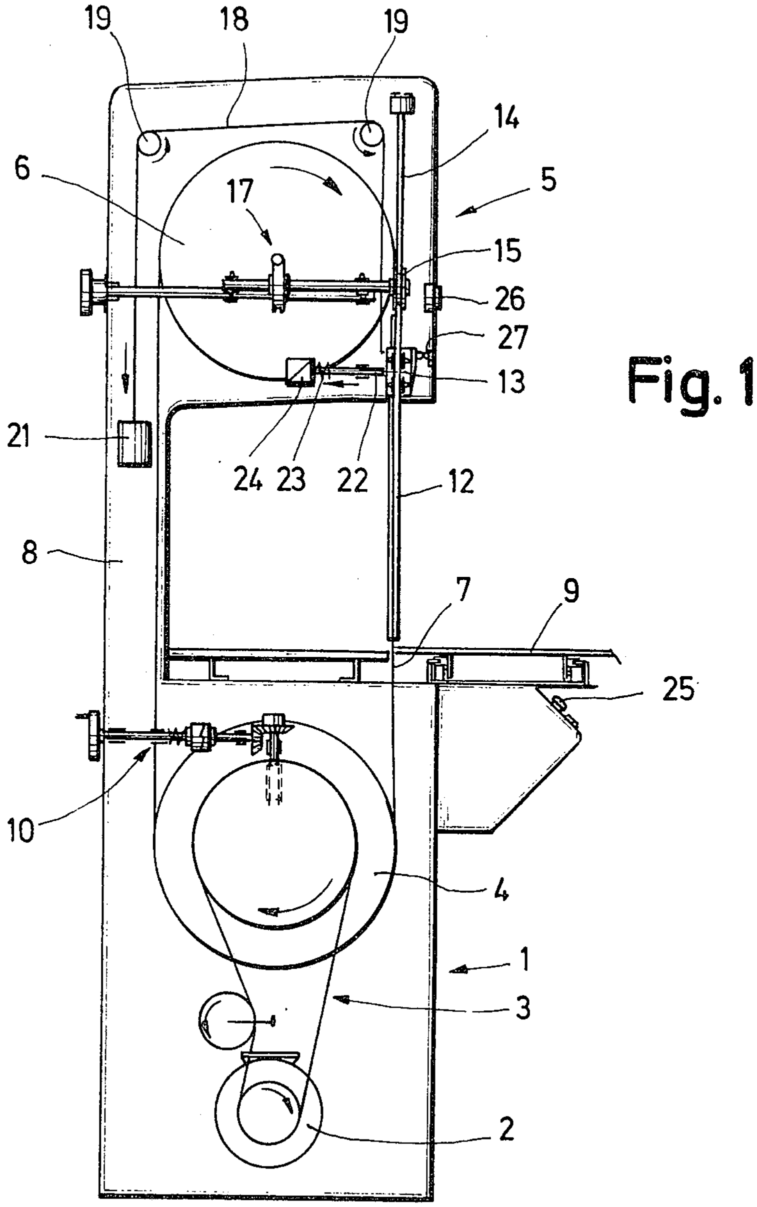
FIG. 1 is a rear elevational view showing schematically a band saw embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The band saw illustrated in the drawings comprises in a known manner a lower frame 1, in which an electric motor 2 drives a lower saw wheel 4 through a belt drive 3, and an upper frame 5, in which an upper saw wheel 6, corresponding to the lower saw wheel 4, is arranged to be freely rotatable. Over the two saw wheels 4 and 6 runs a band-shaped saw blade 7, which extends on the one side of the band saw in a housing part 8 connecting the lower and upper frames and which is open on the oppositely disposed side. A feed table 9, on which the cutting stock is pushed against the band saw, is arranged on the lower frame 1. Provided for the saw blade 7 in likewise known manner are a tensioning device, guide devices and a cleaning and stripping device, of which only the tensioning device is illustrated in the drawing and provided with the reference symbol 10.

Figure 2:
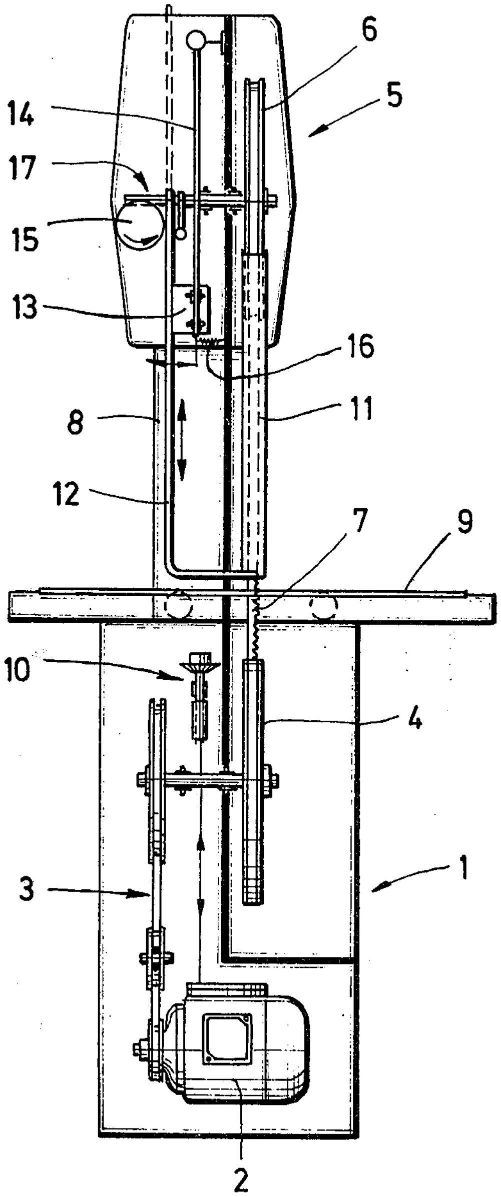
FIG. 2 is a side elevational view of the band saw of FIG. 1 with portions removed for purposes of illustration.

According to the invention, the saw blade 7 in its cutting region between the upper frame 5 and the feed table 9 is covered by a guard rail 11. This is firmly connected with a guide axle or shaft 12, which extends parallel to it, lies behind the saw blade 7 in the cutting direction, protrudes into the interior of the upper frame 5 and is there mounted by means of an axial bearing 13 to be displaceable on a pendulum axle or shaft 14. The pendulum axle 14 is suspended at its upper end so as to be pivoted or swivelled parallel to the cutting direction. Thus, the upper pendulum axle or shaft 14 and the lower guide axle or shaft 12 from a pendulum assembly pivotally mounted at the upper end of axle or shaft 14. On displacement of the guide axle 12 along the pendulum axle 14, the guard rail 11, firmly connected with the guide axle 12, is simultaneously raised and it then exposes the saw blade 7 above the feed table 9 to the extent that it is raised. In FIG. 2, the guide axle 12 is shown in broken lines in a raised position.

The elevating of the guard rail 11 and of the guide axle 12 is caused by a friction wheel 15, which revolves in the upper frame 5 and which on swivelling or pivoting of the guard rail in the cutting direction is engaged in a force-locking connection with the guide axle 12. By the rotation of the friction wheel 15, guide axle 12 and guard rail 11 are raised upwardly and thereby expose the band saw 7 to the stock to be cut. The force-locking connection between friction wheel 15 and guide axle 12 remains in being for so long as the guard rail 11 is pivoted or swivelled in the cutting direction, thus for so long as the stock to be cut presses in the cutting direction against the guard rail 11. As soon as this swivelling or pivoting ends, which will occur as soon as the saw blade is exposed to the necessary cutting height, the guard rail 11 together with the guide axle 12 is swivelled or pivoted back in reverse of cutting direction by a spring 16 which is mounted between pendulum axle 14 and the upper frame 5. Thus, the guide axle 12 is removed from the friction wheel 15 and the upward movement of guard rail 11 will stop.

The friction wheel 15 is driven by the upper saw wheel 6 through a suitable gearing 17. To avoid a jerky falling down of the guard rail 11, the latter is connected to a counterweight 21 by a rope 18 and deflecting rollers 19.

When the guard rail 11 is in its lowermost position completely covering the cutting region of the band saw 7, it is arrestable or retained in place by a locking bolt 22 projecting into an opening in the guard rail 11. The locking bolt 22 is slidably mounted on frame 5 and is urged by a spring 23 into arresting position and can be withdrawn from the opening in the guard rail 11 by an electro-magnet 24 acting against the force of the spring 23. The electro-magnet 24 is arranged by conventional electrical circuitry to be switched on only for as long as the band saw is switched on. When the band saw is switched off, the guard rail 11 will cover the entire cutting region of the saw blade 7 above the feed table 9 and is then arrested in this position by the locking bolt 22. After the band saw is switched on by means of the main switch 25, the electro-magnet 24 can be energized by a switch 26 and the arresting action of the guard rail 11 is released. If the operator now pushes a cutting stock to be cut on the feed table 9 toward the saw blade 7, then the guard rail 11 covering the saw blade is swivelled or pivoted in the cutting direction, the guide axle 12 is moved into force-locking contact with the rotating friction wheel 15 and the guard rail 11 is displaced upwardly. As soon as the necessary passage height for the cutting stock to be cut is reached, the guide axle 12 is removed from the friction wheel by the spring 16, so that the upward movement of the rail 11 ceases. This now again sinks downwardly, slowly due to the counterweight 21. As soon as it then comes into contact with the cutting stock, it is swivelled or pivoted anew in the cutting direction, again coming into contact with the friction wheel 15 and is againt displaced upwardly. This process repeats itself during the entire passage of the cutting stock, so that the passage height exposed by the guard rail 11 adapts again accurately to the contours of the cutting stock that is being cut. As soon as the sawing process is completed, the guard rail 11 falls back into its initial position and covers the saw blade 7 in the entire cutting region. In this manner, only that region of the saw blade is exposed, which is actually required for sawing.

As soon as the guard rail is in its lowermost position, a limit switch 27 is actuated by it or by a part moved together with it. This limit switch is ineffective when the band saw is switched on; but when the band saw is switched off, this limit switch functions to deenergize the electro-magnet 24. Thereby, the locking bolt 22 projects automatically into the opening in the guard rail 11 and arrests or secures the guard rail in the lowermost position, when the band saw is switched off.

It is claimed:

1. A band saw for cutting stocks of material such as bone and meat comprising a frame on which are supported spaced upper and lower rotatable wheels, a saw blade extending between and mounted on said wheels and adapted to be driven thereby, a feed table positioned between said wheels for supporting stock adjacent to the saw blade during a cutting operation, a guard rail having an idle position covering the saw blade in its cutting region above the feed table, support means for said guard rail mounted to allow movement of the guard rail (1) in a parallel direction with respect to said saw blade an amount sufficient to expose the cutting region of said saw blade to the height of passage necessary for cutting said stock and (2) a limited amount toward the cutting edge of the saw blade upon application of pressure of the stock against the guard rail, and actuating means operatively associated with said support means for moving said support means and thereby said guard rail upward in said parallel direction so as to expose said saw blade the necessary amount to allow cutting of the stock, said actuating means being responsive to the movement of said guard rail toward said cutting edge to move said support means and thereby said guard rail an amount sufficient only to expose said saw blade to the necessary height of passage of said stock.

2. The band saw that is defined in claim 1, wherein said actuating means includes a rotatable friction wheel engagable by said support means for moving said support means upward, said support means being movable into engagement with said friction wheel when said guard rail is moved said limited amount toward the cutting edge of the saw blade.

3. The band saw that is defined in claim 2, wherein biasing means normally urge said support means out of engagement with said rotating friction wheel.

4. The band saw that is defined in claim 2, wherein said friction wheel is operatively connected to said uppper rotatable wheel so as to be driven when said upper rotatable wheel is rotated.

5. The band saw that is defined in claim 1, wherein said support means includes a pendulum assembly supported on said frame for swinging movement in the plane of the cutting portion of the saw blade, said pendulum assembly having an upper pendulum shaft pivotally connected to the frame and a lower guide shaft secured to said guide rail, said pendulum and guide shafts being slidably connected together for contraction and extension of the pendulum assembly, said guide shaft being engagable with said actuating means for contracting said pendulum assembly when said guard rail is moved toward said cutting edge.

6. The band saw that is defined in claim 1, wherein a counterbalance means is operatively connected to said guard rail to ease the descent of said guard rail when the latter is moved in a direction away from said cutting edge.

7. The band saw that is defined in claim 1, wherein arresting means operatively extend between said frame and said guide rail for securing the latter in said idle position.

8. The band saw that is defined in claim 7, wherein said arresting means includes a recess in said guide rail, and a spring actuated bolt mounted on said frame and urged by the spring into said recess.

9. The band saw that is defined in claim 8, wherein said arresting means includes an electro-magnet for biasing the bolt out of said recess when it is desired to operate the band saw.

10. The band saw that is defined in claim 9, wherein said band saw is electrically driven, and said electro-magnet is adapted to be energized only when said band saw is electrically energized.

11. The band saw that is defined in claim 10, wherein a limit switch is mounted on said frame to be actuated when said guard rail is in its idle position, said limit switch being operable to open the electric circuit to said electro-magnet when the band saw is deenergized.

12. A band saw for cutting stocks of materials such as bone and meat comprising a frame on which are supported spaced upper and lower rotatable wheels, a saw blade extending between and mounted on said wheels and adapted to be driven thereby, a feed table positioned between said wheels for supporting stock adjacent to the saw blade during a cutting operation, a guard rail having an idle position covering the saw blade in its cutting region above the feed table, support means for said guard rail mounted to allow movement of the guard rail (1) in a parallel direction with respect to said saw blade an amount sufficient to expose the cutting region of said saw blade to the height of passage necessary for cutting said stock and (2) a limited amount toward the cutting edge of the saw blade upon application of pressure of the stock against the guard rail, actuating means operatively associated with said support means for moving said support means and thereby said guard rail upward in said parallel direction so as to expose said saw blade the necessary amount to allow cutting of the stock, said actuating means being responsive to the movement of said guard rail toward said cutting edge to move said support means and thereby said guard rail upward an amount sufficient only to expose said saw blade to the necessary height of passage of said stock, biasing means normally urging said guard rail away from said cutting edge to a position wherein said actuating means is nonresponsive for moving said support means and guard rail upward, counterbalancing means operatively connected to said guard rail to ease the descent of said guard rail when the latter is returning from an upper position toward said idle position, and an arresting means between said frame and said guide rail for retaining the latter in said idle position.

* * * * *